United States Patent
Liu et al.

(10) Patent No.: US 9,971,031 B2
(45) Date of Patent: May 15, 2018

(54) SYSTEM AND METHOD FOR 3D IMAGING USING COMPRESSIVE SENSING WITH HYPERPLANE MULTI-BASELINE DATA

(71) Applicant: Mitsubishi Electric Research Laboratories, Inc., Cambridge, MA (US)

(72) Inventors: Dehong Liu, Lexington, MA (US); Petros Boufounos, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 307 days.

(21) Appl. No.: 14/603,460

(22) Filed: Jan. 23, 2015

(65) Prior Publication Data

US 2016/0216372 A1    Jul. 28, 2016

(51) Int. Cl.
*G01S 13/90* (2006.01)

(52) U.S. Cl.
CPC ................................. *G01S 13/9035* (2013.01)

(58) Field of Classification Search
CPC .......... G01S 13/88; G01S 13/89; G01S 13/90; G01S 13/9035; G01S 7/02; G01S 7/28; G01S 7/285; G01S 7/292; G01S 7/41; G01S 7/411; G01S 7/412; G01S 13/9023; G06F 12/02; G06F 12/0207; G06F 17/30; G06F 17/30017; G06F 17/30286; G06F 17/30587; G06F 17/30592; G06T 5/001; G06T 5/003; G06T 5/50; H01Q 21/06; H01Q 21/22
USPC ............................................. 342/25 R–25 F
See application file for complete search history.

(56) References Cited

U.S. PATENT DOCUMENTS

| | | | | | |
|---|---|---|---|---|---|
| 3,725,928 | A | * | 4/1973 | Klimchak | G01S 7/412 342/192 |
| 4,001,820 | A | * | 1/1977 | Rosenbaum | G01S 7/292 342/192 |
| 5,247,630 | A | * | 9/1993 | Parks | G06F 12/0207 711/1 |
| 5,463,397 | A | * | 10/1995 | Frankot | G01S 13/9023 342/194 |
| 5,647,058 | A | * | 7/1997 | Agrawal | G06F 17/30017 |
| 5,659,318 | A | * | 8/1997 | Madsen | G01S 13/9023 342/156 |
| 6,097,835 | A | * | 8/2000 | Lindgren | G06T 5/003 348/147 |
| 6,154,746 | A | * | 11/2000 | Berchtold | G06F 17/30592 |
| 6,911,932 | B1 | * | 6/2005 | Martinez | G01S 13/9023 342/118 |

(Continued)

OTHER PUBLICATIONS

R. E. Carande, "Dual Baseline and Frequency Along-Track Interferometry"; IEEE publication No. 91-72810/92$03.00; copyright in the year 1992.*

(Continued)

*Primary Examiner* — Bernarr E Gregory
(74) *Attorney, Agent, or Firm* — Gene Vinokur; James McAleenan; Hironori Tsukamoto

(57) ABSTRACT

A method and system generates a three-dimensional (3D) image by first acquiring data from a scene using multiple parallel baselines and multiple different pulse repetition frequencies (PRF), wherein the multiple baselines are arranged in a hyperplane. Then, a 3D compressive sensing reconstruction procedure is applied to the data to generate the 3D image corresponding to the scene.

15 Claims, 4 Drawing Sheets

(56) References Cited

U.S. PATENT DOCUMENTS

| | | | | |
|---|---|---|---|---|
| 7,298,922 | B1* | 11/2007 | Lindgren | G06T 5/50 |
| | | | | 342/25 A |
| 7,436,348 | B2* | 10/2008 | Nohmi | G01S 13/9035 |
| | | | | 342/159 |
| 7,928,893 | B2 | 4/2011 | Baraniuk et al. | |
| 8,144,049 | B2* | 3/2012 | Mizutani | H01Q 21/22 |
| | | | | 342/147 |
| 8,471,759 | B2 | 6/2013 | Sun et al. | |
| 8,665,132 | B2* | 3/2014 | Ranney | G01S 13/90 |
| | | | | 342/179 |
| 9,864,054 | B2* | 1/2018 | Liu et al. | G01S 13/9035 |
| 2014/0232591 | A1 | 8/2014 | Liu et al. | |
| 2014/0266869 | A1 | 9/2014 | Liu et al. | |
| 2015/0253423 | A1* | 9/2015 | Liu | G01S 13/9035 |
| | | | | 342/25 F |

OTHER PUBLICATIONS

M. Lucido et al., "Dual-Baseline SAR Interferometry from Correlated Phase Signals"; IEEE publication No. 1-4244-1539-X/08/$25.00; copyright in the year 2008.*

X. X. Zhu and R. Bamler, "Tomographic SAR inversion by L1-norm regularization—the compressive sensing approach," IEEE Trans. Geoscience and Remote Sensing, vol. 48(10), pp. 3839-3846, Oct. 2010.

G. Fornaro, F. Serafino, and F. Soldovieri, "Three-dimensional focusing with multipass SAR data," IEEE Trans. Geoscience and Remote Sensing, vol. 41(3), pp. 507-517, Mar. 2003.

J. M. Lopez-Sanchez and J. Fortuny-Guasch, "3-D imaging using range migration techniques," IEEE Trans. antennas and propagation, vol. 48(5), pp. 728-737, May 2000.

* cited by examiner

SYSTEM AND METHOD FOR 3D IMAGING USING COMPRESSIVE SENSING WITH HYPERPLANE MULTI-BASELINE DATA

FIELD OF THE INVENTION

This invention relates generally to synthetic radar systems, and more particularly to tomographic 3D imaging systems.

BACKGROUND OF THE INVENTION

Virtual array systems use a moving antenna to synthesize a large virtual aperture and, thus, achieve high resolution images. A single pass virtual array system is capable of imaging a two-dimensional (2D) range-azimuth reflectivity of a scene without any elevation resolution. However, the three-dimensional (3D) structure of the scene, such as features in a 3D terrain, is not preserved. The 2D image is essentially a projection of the 3D reflectivity space into the 2D range-azimuth imaging plane. This projection may cause several artifacts. For example with layover artifacts, several terrain patches with different elevation angles are mapped to the same range-azimuth resolution cell. With shadowing artifacts, certain parts of the scene are not visible to the virtual array system because another structures are in the path of illumination. These artifacts cannot be resolved by a single pass, even using interferometric array imaging techniques.

In order to perform 3D imaging, multi-baseline data are necessary in the elevation dimension. The multi-baseline observations can be acquired by multiple passes of a single-channel virtual array platform. This idea has been realized with the launch of the TerraSAR-X and the COSMO-Skymed satellites. With the additional elevation dimension, a 3D image is able to separate multiple scatterers in the scene along elevation, even when the scatterers are present in the same range-azimuth location. However, 3D imagery requires several trade-offs. First, to acquire with multiple baselines, the single-channel platform needs to perform several passes over the scene. This makes data collection time consuming and expensive. Second, the elevation resolution is much worse than that of range and azimuth due to the small elevation aperture, also known as a "tight orbital tube" in virtual array sensors.

As shown in FIG. 1, a conventional 3D SAR system for generating a 3D image using multiple baseline arrays of antennas 101 mounted on a single radar platform moving 103 in a 3D elevation, range and azimuth space. The angular aperture of the baselines in the azimuth-elevation plane can be denoted by $\theta$. The figure shows point scatterers (reflectors) 102 for different elevations in the scene.

FIG. 2 show a conventional 3D imaging process for the system of FIG. 1. Data 201 are acquired at each baseline (1, . . . , N) 101. 2D SAR imaging 210 is applied independently to each data 201 to construct 2D images ($I_1, I_2, \ldots, I_N$) 215. The images are registered and aligned 220, followed by 3D image reconstruction 230 to obtain a 3D image 240 of the scene.

With the additional elevation dimension, the 3D image can separate multiple scatterers along the elevation dimension, even when the scatterers are present in the same range-azimuth location. However, 3D imagery requires several trade-offs.

First, to acquire images at multiple baselines, the platform needs to perform several passes over the area of interest. This makes data collection time consuming and very expensive. Second, the elevation resolution is much worse than that of range and azimuth due to the small elevation aperture, which is known as a tight orbital tube, of modern SAR sensors, e.g., ≈500 meters diameter.

The elevation resolution can be improved using compressive sensing (CS) based approaches, see Zhu et al., "Tomographic SAR inversion by $L_1$-norm regularization—the compressive sensing approach," IEEE Trans. Geoscience and Remote Sensing, vol. 48(10), pp. 3839-3846, October 2010. That CS approach uses multiple baselines, a single PRF of a single SAR platform. In that method, a 2D range-azimuth image is reconstructed for each baseline. Then, compressive sensing based method is used improve elevation resolution. That method only considers sparsity for each 2D range-azimuth pixel.

In U.S. application Ser. No. 14/202,449, "System and Method for 3D SAR Imaging using Compressive Sensing with Multi-Platform, Multi-Baseline and Multi-PRF Data," filed by Liu et al. on Mar. 10, 2014, now U.S. Pat. No. 9,864,054, a compressive sensing based method is considered to reconstruct 3D images. However, the baselines are restricted to the azimuth-elevation plane.

SUMMARY OF THE INVENTION

The embodiments of the invention perform 3D virtual array imaging using compressive sensing (CS) techniques with data collected by multiple parallel baselines moving in a hyperplane, rather than the azimuth-elevation plane. The goal is to reduce the total amount of acquired data that needs to be acquired for the imaging, and to increase the elevation resolution. In particular, array data are collected by multiple parallel baselines moving in a hyperplane, rather than the azimuth-elevation plane. Each baseline includes multiple antennas elements.

Each baseline is randomly distributed in the hyperplane with different range and elevation coordinates. Each baseline uses a fixed pulse repetition frequency (PRF), which can be different from the PRF used by other baselines. Therefore, the baselines provide flexibility for data the collection. For example, the baselines can be due to multiple passes of a single virtual antenna array platform, or a single pass from multiple moving array platforms. Assuming all the baselines are well located in the spatial domain and aligned to each other, the multi-baseline data can be considered in its entirety to generate a high resolution 3D reflectivity map, using a CS-based iterative imaging process.

The invention provides several advantages over a method described in related U.S. application Ser. No. 14/202,449, "System and Method for 3D SAR Imaging using Compressive Sensing with Multi-Platform, Multi-Baseline and Multi-PRF Data," filed by Liu et al. on Mar. 10, 2014, now U.S. Pat. No. 9,864,054.

First, the spatial locations of baselines are extended from the 2D azimuth-elevation plane to a hyperplane. This extension provides more flexibility for data collection. Second, the total number of baselines in hyperplane required for imaging is much less than that in 2D azimuth-elevation plane. Third, motion errors of the moving platform during in data collection ensures random measurements and information collection for scene reconstruction using compressive sensing techniques.

BRIEF DESCRIPTION OF THE PREFERRED EMBODIMENTS

DETAILED DESCRIPTION OF THE PREFERRED EMBODIMENTS

Figure 1:
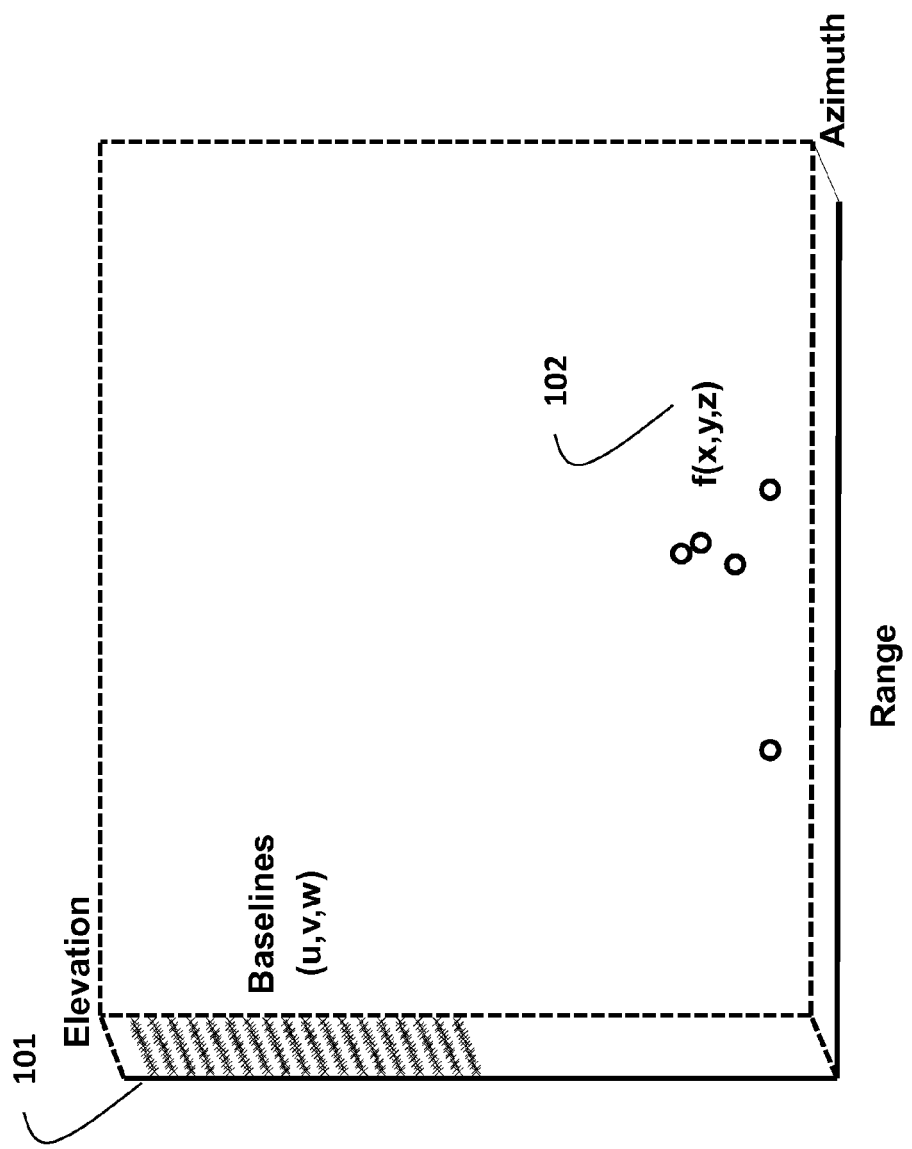
FIG. 1 is a schematic of a conventional tomographic synthetic aperture radar system.
Figure 2:
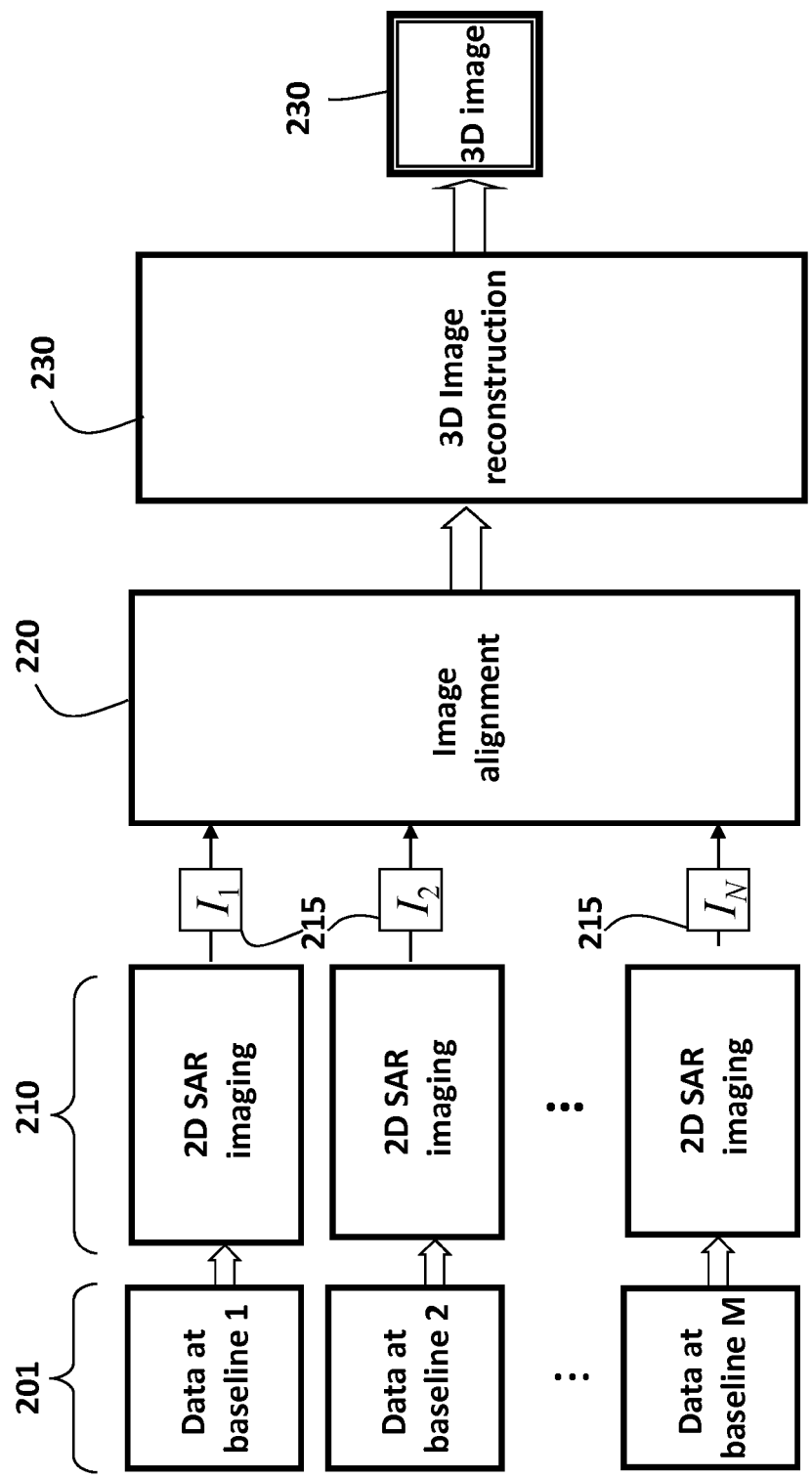
FIG. 2 is a block diagram of a conventional multi-baseline synthetic aperture radar system.
Figure 3:
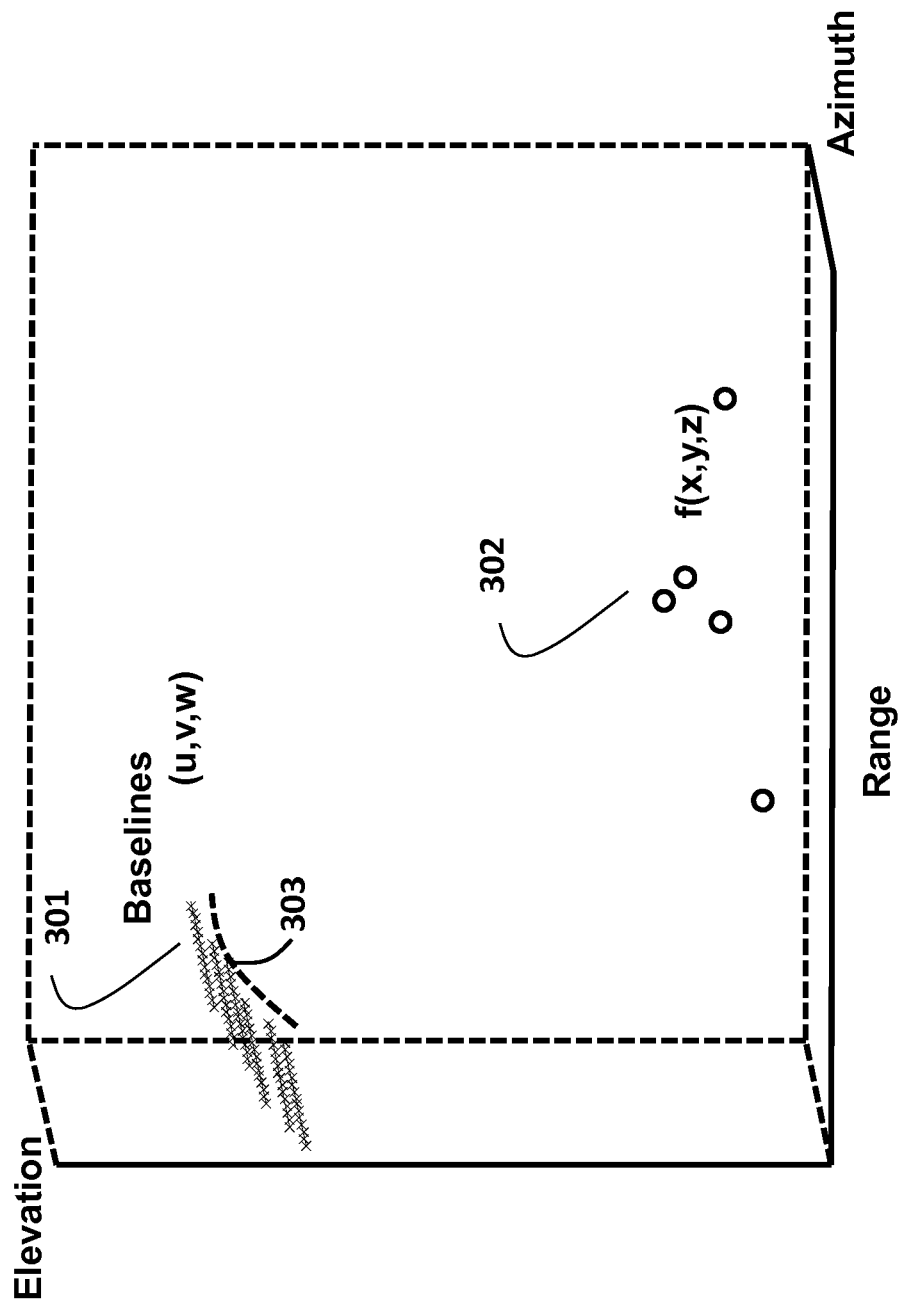
FIG. 3 is a schematic of a compressive sensing based 3D synthetic aperture radar system according to embodiments of the invention.
Figure 4:
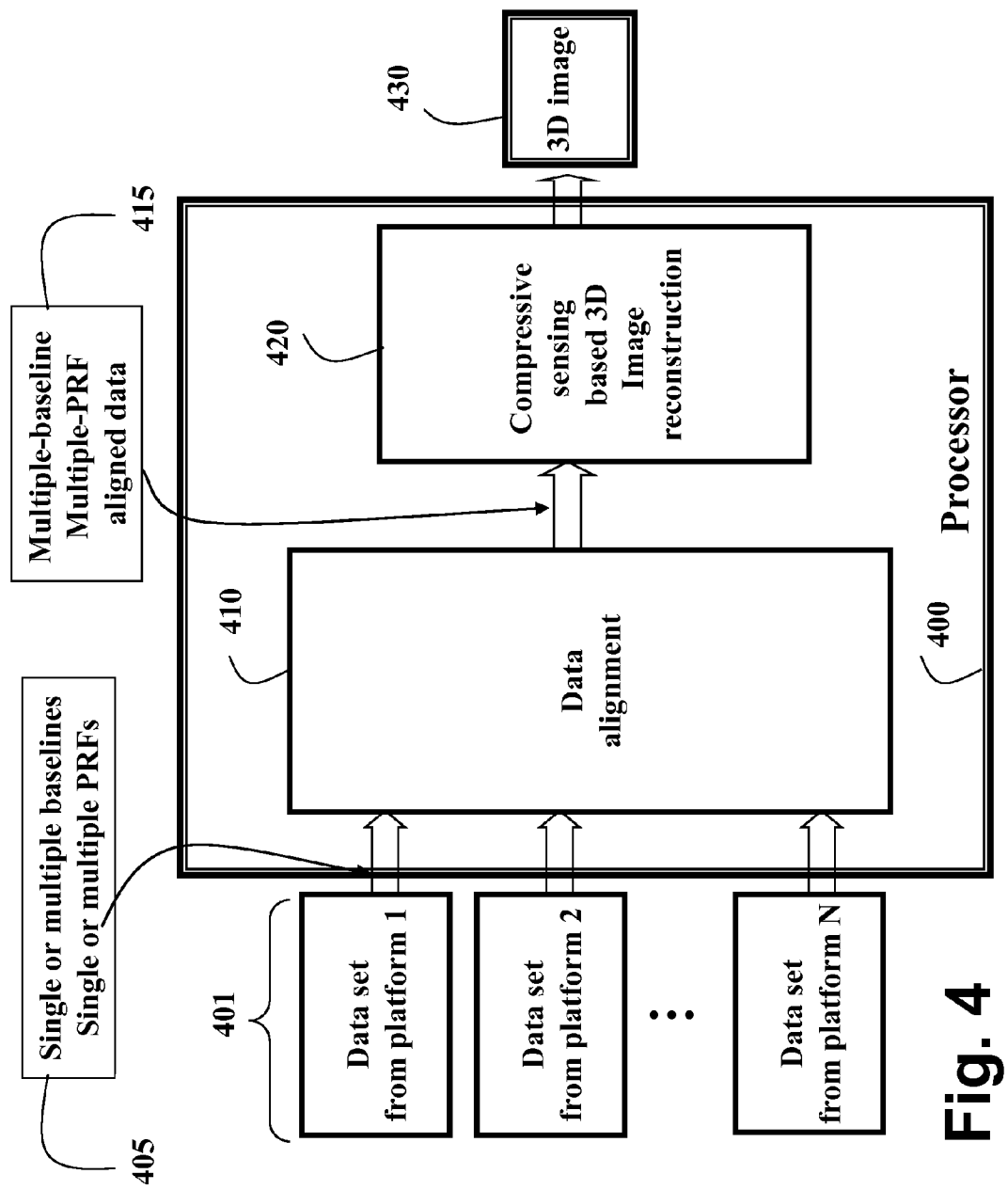
FIG. 4 is a block diagram of a system and method for generating a 3D image using multiple synthetic aperture radar systems according to the embodiments of the invention.

As shown in FIGS. 3 and 4, the embodiments of the invention provide a method for generating a synthetic aperture radar (SAR) 3D image. The method acquires data sets at multiple baselines 301. The multiple base lines can be established using a single platform performing several passes over a scene, or multiple different platforms passing over the same area. Each baseline uses a fixed pulse repetition frequency (PRF), which can be different from the PRF used in other baselines.

In our method, we consider data of multiple PRFs and the multiple baselines 301 arranged in a hyperplane with small jitters, which means data can be collected from multiple platforms, as shown in FIG. 3. Prior art system typically move only in range, azimuth and elevation dimensions.

Let the coordinates of the moving antennas 301 be (u,v,w) in the range-azimuth-elevation space, and the coordinates of the reflectors 302 be (x,y,z). When the baselines are located in the azimuth-elevation plane, u=0, and the baseline locations are determined by 1D coordinate w since all baselines are parallel to azimuth axis.

However, when the baselines are located in a hyperplane, the baseline locations are determined by 2D coordinates (u,w). We assume baseline locations (u, w) are randomly distributed on an arc 303 of a circle centered at a scene center. We notice that the number of baselines in the arc shaped hyperplane are much less than that in the azimuth-elevation plane for the same angular aperture θ. We also note that the elevation aperture is larger than a single virtual array orbit tube. The perturbations and motion errors on the hyperplane baselines ensure the random measurements and information collection used in compressive sensing-based reconstruction.

For comparison purposes, we perform the data acquisition followed by reconstruction using both conventional imaging method and our CS-based method. The data can be acquired using simulation. For the simulations, we consider point scatterers (reflectors) 302 in a 3D scene. We consider 21 parallel baselines in the azimuth direction randomly distributed in the hyperplane (u, w). The corresponding elevation and range coordinates are randomly selected from 201×10 possible coordinates (u,w) in the range-elevation plane.

Within each baseline, data are collected with a fixed pulse repetition frequency (PRF). For different baseline, the corresponding PRF is randomly selected. Specifically, starting with a base PRF, all baselines are downsampled by a random integer amount. In other words, each PRF is a fraction of the base PRF, with the downsampling rate randomly selected from a set {2,3,4,5}. Considering the varying speed of the moving platform, there can be small jitters in the data for spatial locations of the antenna elements on the moving platform collecting data. We assume all the data are perfectly aligned. By exploiting the sparsity of the scene, we reconstruct a CS-based 3D image.

The processing block diagram is shown in FIG. 4. As shown in FIG. 4, data sets 401 are acquired from N platforms. As stated above, the data sets can be acquired 405 during multiple passes of a single system, where for the purpose of this description, each pass generates an independent data set, or multiple passes by different SAR systems, or some combination of multiple passes of a single system and independent systems.

The data sets 401 are registered and aligned 410 to produce aligned data sets 415. After the alignment, CS-base 3D image reconstruction is applied directly 420 to the aligned multiple-baseline, multiple-PRF data sets 415 to obtain the 3D image 430. The method can be performed in a processor connected to memory, input/output interfaces and the antennas by buses as known in the art.

We compare two different results: reduced data collection using 21 baselines, each with different PRF, and conventional imaging methods, and reduced data collection, as in and our CS-based imaging approach. For conventional 3D imaging, we use a near-field range migration imaging procedure by upsampling the data and filling the missing data with zeros. This produces a fast beamforming result from the acquired data and implements the inverse of the acquisition operator. For CS-based imaging, we fill in the missing data using an iterative procedure that exploits the sparsity of the scene, and then perform fast range-migration imaging.

Our approach provides several advantages compared to our early work in the related application. First, we extend the spatial locations of the baselines from the 2D azimuth-elevation plane to a 2D hyperplane.

Second, we consider motion errors of the moving platform in data collection. These motion errors ensure the random measurements and information collection used in compressive sensing based reconstruction.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for generating a three-dimensional (3D) image, wherein the image is a virtual array image, comprising steps of:
  acquiring data from reflectors in a scene using multiple parallel baselines, wherein the multiple parallel baselines are determined by antenna array platforms passing over the scene and multiple different pulse repetition frequencies (PRF), wherein two-dimensional coordinates of the multiple baselines are arranged in a hyperplane; and
  applying a 3D compressive sensing reconstruction procedure to the data to generate the 3D virtual array image corresponding to the scene.

2. The method of claim 1, wherein the data are sampled uniformly for each baseline.

3. The method of claim 1, wherein the baselines are predetermined to be parallel to each other.

4. The method of claim 1, wherein each baseline includes multiple antenna elements, and spatial locations of antenna elements are subject to jitter.

5. The method of claim 1, wherein the PRF of each baseline is independent to each other PRF.

6. The method of claim 1, wherein the data are collected from multiple antenna virtual array systems.

7. The method of claim 1, wherein a spatial distribution of the multiple baseline is random.

8. The method of claim 1, wherein an elevation aperture is larger than a single virtual array orbit tube.

9. The method of claim 1, wherein the compressive sensing method is an iterative reconstruction method.

10. The method of claim 1, wherein the elevation resolution is higher than a predetermined 3D virtual array system.

11. The method of claim 1, wherein the total number of baselines is fewer than a predetermined 3D virtual array system.

12. The method of claim 1, wherein locations of the baselines are randomly distributed on an arc of a circle centered at a scene center.

13. The method of claim 1, wherein each baseline is randomly distributed in the hyperplane with different range and elevation coordinates.

14. The method of claim 1, wherein coordinates of the baselines are (u,w) in a range-azimuth-elevation space, and the coordinates of reflectors in the scene are (x,y,z) are parallel to azimuth axis.

15. A system for generating a three-dimensional (3D) image, wherein the image is a virtual array image, comprising:

multiple parallel baselines determined by antenna array platforms passing over the scene in a hyperplane, wherein data are acquired according to the baselines from reflectors in a scene using and multiple different pulse repetition frequencies (PRF); and a processor connected to a memory storing the data of the baselines configured to apply a 3D compressive sensing reconstruction procedure to the data to generate the 3D virtual array image corresponding to the scene.

* * * * *